United States Patent
Wang et al.

(10) Patent No.: US 11,342,616 B2
(45) Date of Patent: May 24, 2022

(54) CELL AND BATTERY

(71) Applicant: NINGDE AMPEREX TECHNOLOGY LIMITED, Ningde (CN)

(72) Inventors: Feng Wang, Ningde (CN); Yu Chen, Ningde (CN)

(73) Assignee: NINGDE AMPEREX TECHNOLOGY LIMITED, Fujian (CN)

( * ) Notice: Subject to any disclaimer, the term of this patent is extended or adjusted under 35 U.S.C. 154(b) by 295 days.

(21) Appl. No.: 16/430,048

(22) Filed: Jun. 3, 2019

(65) Prior Publication Data

US 2020/0194743 A1 Jun. 18, 2020

(30) Foreign Application Priority Data

Dec. 18, 2018 (CN) .......................... 201811547628.8

(51) Int. Cl.
*H01M 50/183* (2021.01)
*H01M 10/0585* (2010.01)
*H01M 10/04* (2006.01)
*H01M 50/184* (2021.01)
*H01M 50/116* (2021.01)
*H01M 50/124* (2021.01)
*H01M 10/0525* (2010.01)

(52) U.S. Cl.
CPC ..... *H01M 50/183* (2021.01); *H01M 10/0459* (2013.01); *H01M 10/0585* (2013.01); *H01M 50/116* (2021.01); *H01M 50/124* (2021.01); *H01M 50/184* (2021.01); *H01M 10/0525* (2013.01); *H01M 2200/20* (2013.01); *H01M 2220/20* (2013.01)

(58) Field of Classification Search
CPC .................................................. H01M 50/184
See application file for complete search history.

(56) References Cited

U.S. PATENT DOCUMENTS

| 2014/0099535 A1* | 4/2014 | Chu | H01M 50/183 |
| | | | 429/178 |
| 2014/0370372 A1* | 12/2014 | Kong | H01M 50/116 |
| | | | 429/185 |
| 2019/0207171 A1* | 7/2019 | Choi | H01M 50/183 |

FOREIGN PATENT DOCUMENTS

| CN | 1189924 A | 8/1998 |
| CN | 100464444 C | 2/2009 |
| CN | 201638865 U | 11/2010 |
| CN | 104662697 A | 5/2015 |
| CN | 106058083 A | 10/2016 |

(Continued)

OTHER PUBLICATIONS

Machine translation of JP 2011-258438, Dec. 2011.*

(Continued)

*Primary Examiner* — Jonathan Crepeau
(74) *Attorney, Agent, or Firm* — Morgan, Lewis & Bockius LLP

(57) ABSTRACT

The present disclosure provides a cell and a battery. The cell includes a cell body and a packaging pouch for accommodating the cell body therein. The packaging pouch includes a seal portion, and the seal portion includes a sealed area. The sealed area includes a recess portion. The recess portion is provided in an end surface of the sealed area adjacent to the cell body and is recessed in a direction away from the cell body.

15 Claims, 9 Drawing Sheets

(56) References Cited

FOREIGN PATENT DOCUMENTS

| CN | 106062992 A | 10/2016 |
|---|---|---|
| CN | 107293652 A | 10/2017 |
| CN | 208045554 U | 11/2018 |
| JP | 2000173562 A | 6/2000 |
| JP | 2005332726 A | 12/2005 |
| JP | 2011258438 A | 12/2011 |
| JP | 2013196788 A | 9/2013 |
| JP | 2014032924 A | 2/2014 |

OTHER PUBLICATIONS

Chinese Office Action, CN201811547628,8, dated Dec. 15, 2020, 11 pgs.
Chinese Office Action, CN201811547628,8, dated May 27, 2021, 7 pgs.
Ningde Amperex Technology Ltd, International Search Report and Written Opinion, PCT/CN2019/126424, dated Mar. 4, 2020, 12 pgs.

* cited by examiner

CELL AND BATTERY

CROSS REFERENCE TO RELATED APPLICATION

The present application claims the benefit of prior Chinese Application No. 201811547628.8, filed with the China National Intellectual Property Administration on Dec. 18, 2018. The entire contents of the before-mentioned patent application are incorporated by reference as part of the disclosure of this U.S. application.

FIELD

The present disclosure relates to a technical field of electrochemical devices, and specifically, to a cell and a battery.

BACKGROUND

A lithium-ion battery has been widely applied to various digital products, electric tools, unmanned aerial vehicles, energy storage systems and vehicle power systems due to their high energy density, long cycle life, and high cost performance.

Due to characteristics of an aluminum-plastic composite film serving as a packaging material, a sealing reliability of a soft-packaged lithium-ion battery has always been valued by researchers. Especially, the soft-packaged lithium-ion battery applied to an energy storage system has more strict requirements for long-period sealing reliability. A seal portion of the lithium-ion battery, which is obtained by sealing the lithium-ion battery with a seal head (such as a flat seal head or an oblique seal head) and its sealing technology widely used at present, has low sealing strength, poor creep resistance and short service life (less than three years), and cannot meet the requirement of the lithium-ion battery for the long-period sealing reliability, so that the application of the lithium-ion battery in a long-period energy storage field and a field having high requirements for safety and reliability is limited. In addition, processing and wear problems are caused by an oblique seal head. The sealing process is a key process during the production and manufacture of the soft-packaged lithium-ion battery. Especially, the side sealing and the vacuum sealing process are very important for the safety and reliability of the battery. Thus, it is needed to develop a sealing technology which can meet the requirement for the long-period sealing reliability.

SUMMARY

The present disclosure aims to solve at least one of the technical problems existing in the related art. Thus, an aspect of the present disclosure aims to propose a cell, which has great seal reliability and high safety.

The cell according to embodiments of the present disclosure includes a cell body and a packaging pouch for accommodating the cell body therein. The packaging pouch includes a seal portion, and the seal portion includes a sealed area. The sealed area includes a recess portion. The recess portion is provided in an end surface of the sealed area adjacent to the cell body, and the recess portion is recessed in a direction away from the cell body. Another aspect of the present disclosure provides a battery, and the battery has great seal reliability and high safety.

The battery according to embodiments of the present disclosure includes a cell and a housing for accommodating the cell therein. The cell includes a cell body and a packaging pouch for accommodating the cell body therein. The packaging pouch includes a seal portion. The seal portion includes a sealed area. The sealed area includes a cavity portion. The cavity portion is provided in an end surface of the sealed area adjacent to the cell body, and is recessed in a direction away from the cell body.

BRIEF DESCRIPTION OF THE DRAWINGS

These and other aspects and advantages of embodiments of the present disclosure will become apparent and more readily appreciated from the following descriptions made with reference to the drawings.

Figure 1:
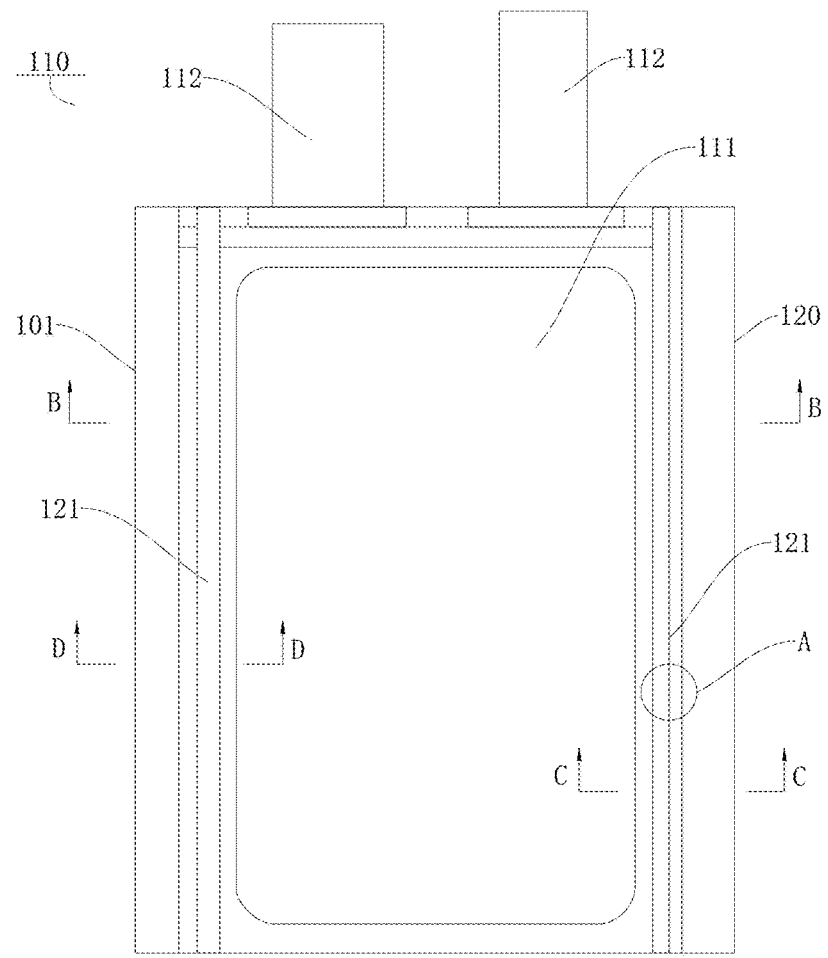
FIG. 1 illustrates a schematic view of a cell according to an embodiment of the present disclosure.

REFERENCES NUMERALS cell 110, cell body 111, tab 112, packaging pouch 120, seal portion 121, first sealed segment 1212, second sealed segment 1213, third sealed segment 1214, accommodating space 130, first casing 140, first bonding layer 141, first metal layer 142, first protection layer 143, second casing 150, second bonding layer 151, second metal layer 152, second protection layer 153, recess portion 160, bulge 161.

DETAILED DESCRIPTION

The embodiments of the present disclosure are described in detail below, and the examples of the embodiments are illustrated in the accompanying drawings, in which the same or similar reference numerals are used to refer to the same or similar elements or elements having the same or similar functions. The embodiments described below with reference to the accompanying drawings are illustrative and only intended to explain the present disclosure, and are not to be construed as limit the present disclosure.

A cell 110 and a battery according to embodiments of the present disclosure will be described below with reference to FIGS. 1-17.

Figure 2:
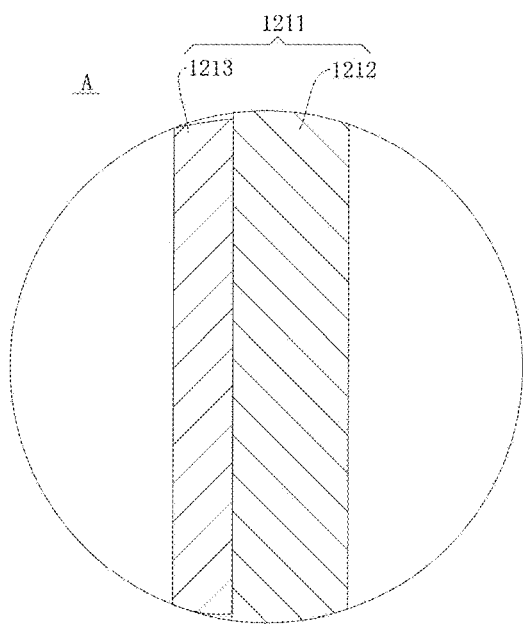
FIG. 2 illustrates an enlarged view of a portion A in a sealed area in FIG. 1.

As illustrated in FIGS. 1 and 2, the cell 110 according to embodiments of the present disclosure includes a cell body 111 and a packaging pouch 120 for accommodating the cell body 111 therein. The cell 110 may include a tab 112 electrically connected with the cell body 111 and the tab 112 extends out of the packaging pouch 120.

Figure 3:
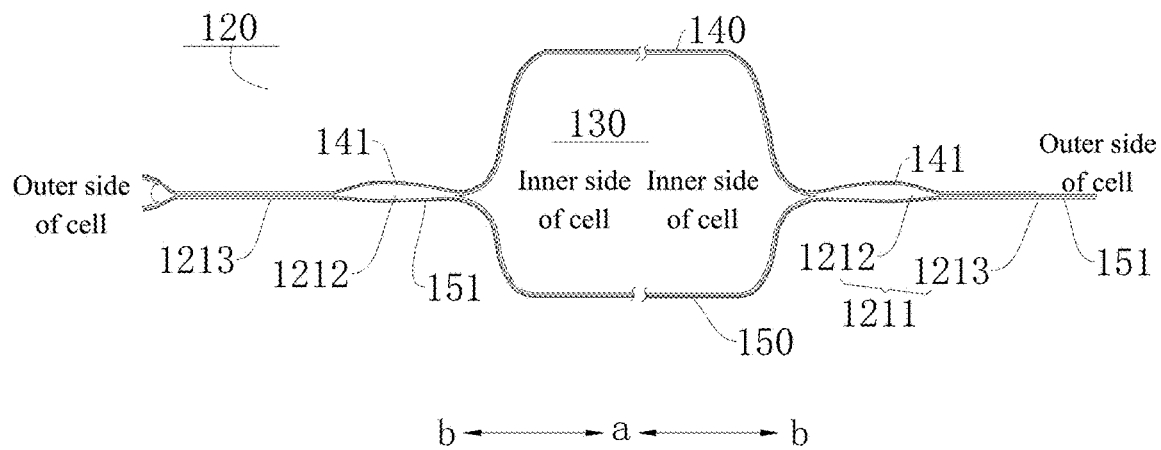
FIG. 3 illustrates a section view of the sealed area of FIG. 1, taken along a section line B-B.
Figure 4:
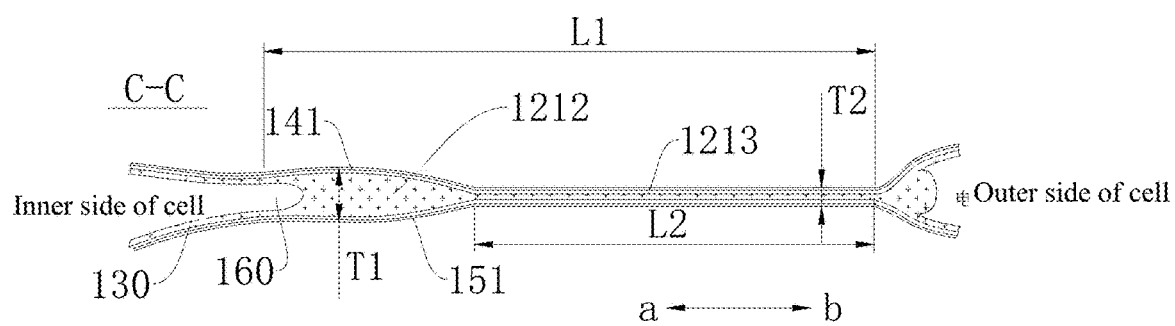
FIG. 4 illustrates a section view of the sealed area of FIG. 1, taken along a section line C-C or D-D.
Figure 5:
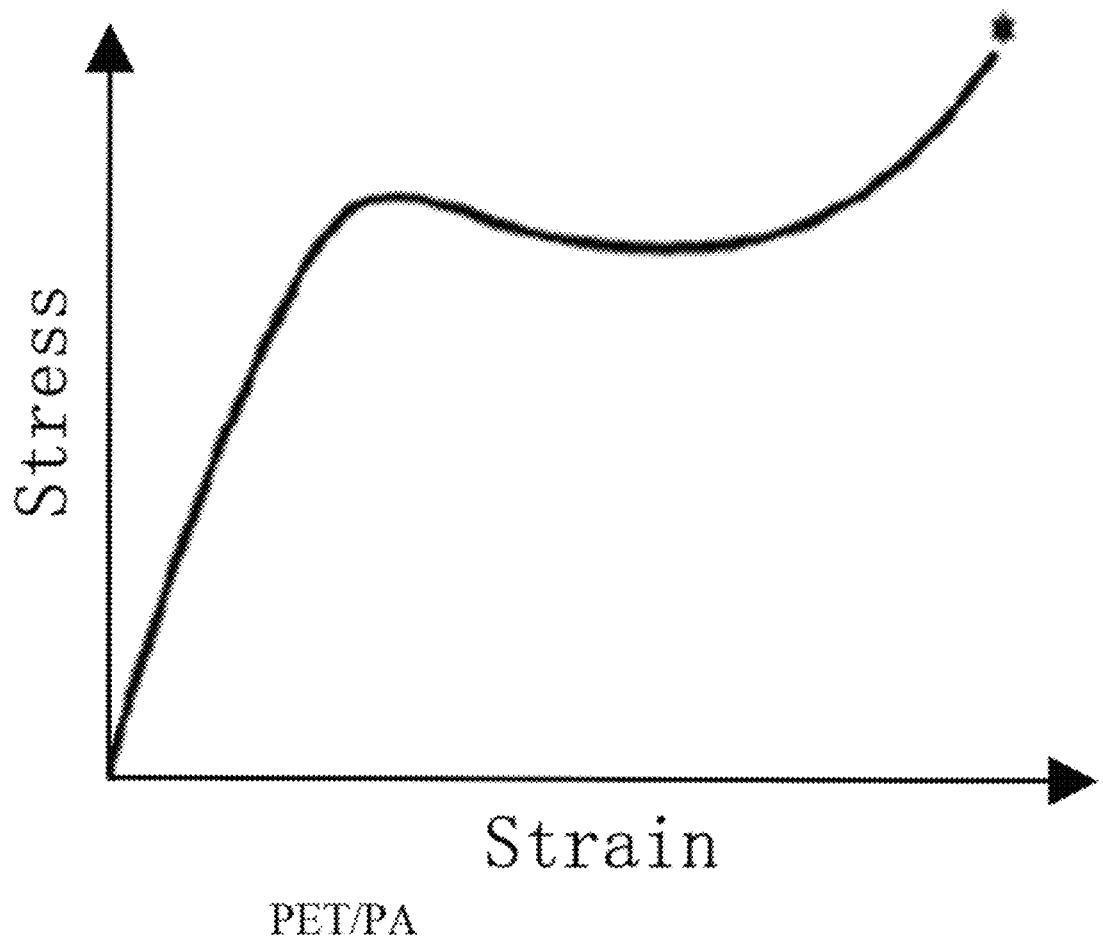
FIG. 5 illustrates a tensile stress-strain curve of an outer layer (PA or PET) of an aluminum-plastic film in FIG. 4.
Figure 6:
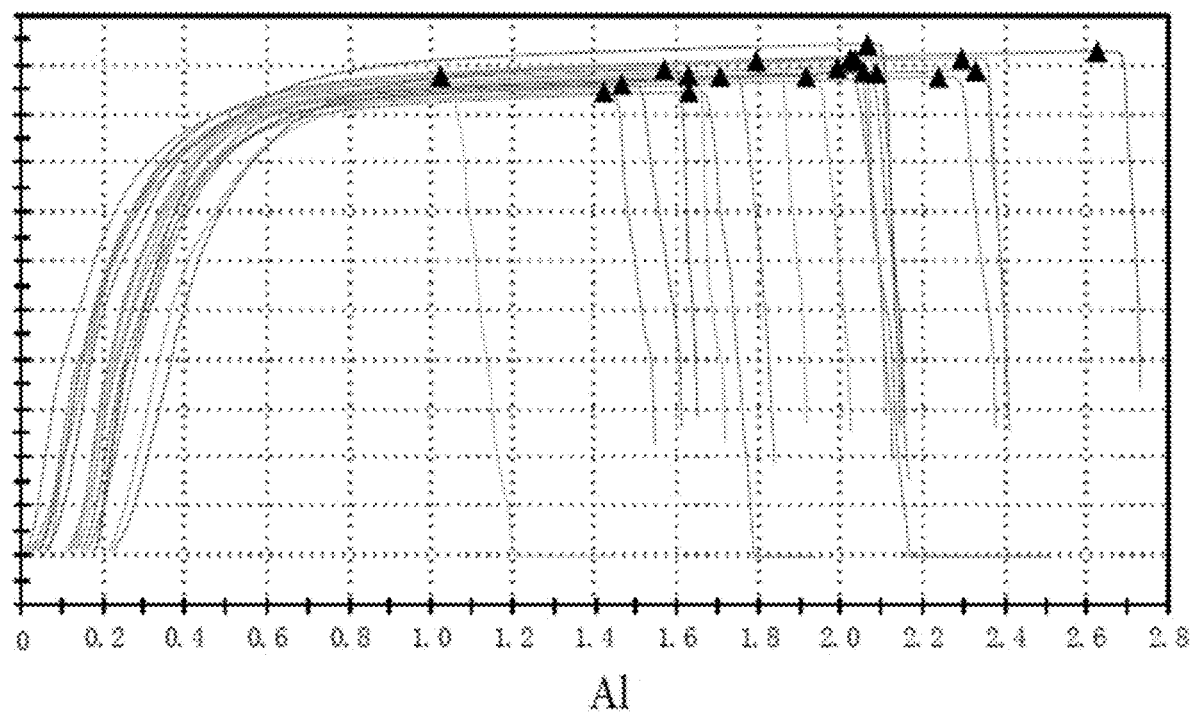
FIG. 6 illustrates a tensile stress-strain curve of a medium layer (Al) of an aluminum-plastic film in FIG. 4.
Figure 7:
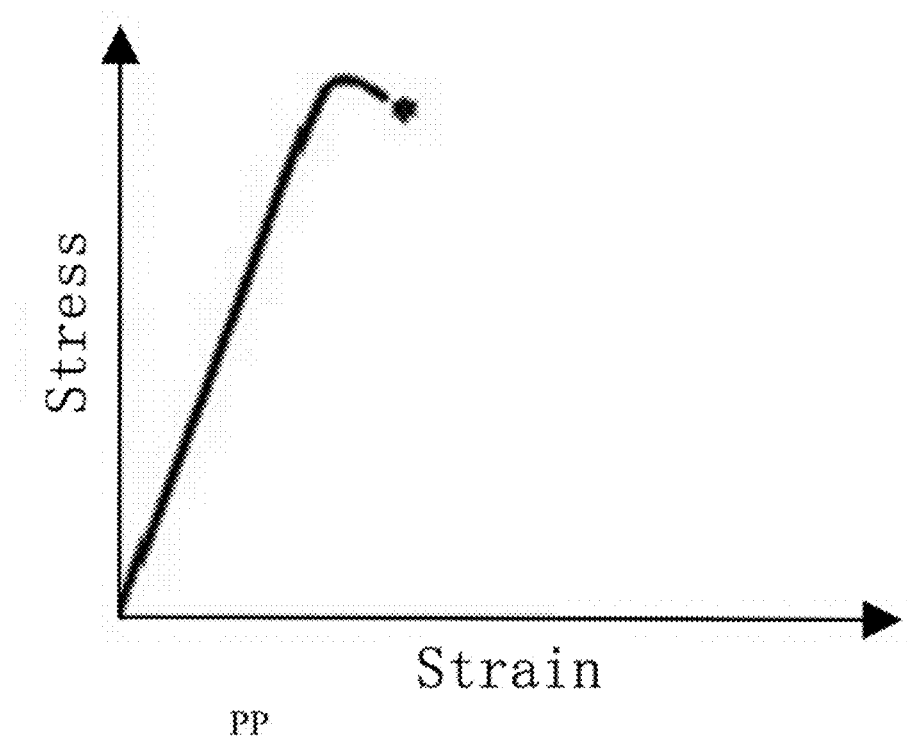
FIG. 7 illustrates a tensile stress-strain curve of an inner layer (PP) of an aluminum-plastic film in FIG. 4.

Specifically, the packaging pouch 120 may include a seal portion 121, and the seal portion 121 may include a sealed area. As illustrated in FIGS. 3 and 4, the sealed area includes a recess portion 160. The recess portion 160 is arranged in an end surface of the sealed area adjacent to the cell body 111, and the recess portion 160 is recessed in a direction away from the cell body 111. Herein, a direction of recessing the recess portion 160 may be construed as that a partial surface of the sealed area is recessed towards an interior of the sealed area itself, so that the recess portion 160 is formed.

With the cell 110 according to embodiments of the present disclosure, by providing the recess portion 160 in the end surface of the sealed area adjacent to the cell body 111 and making the recess portion 160 recessed in the direction away from the cell body 111, which may eliminate a thermal stress resulted by a temperature gradient, a mechanical stress caused by a right-angle seal head on the packaging pouch 120, and a mechanical stress caused by the cell body 111, so that a shape and an appearance of a glue-overflow area of the seal portion 121 may be optimized, a structural defect of the glue-overflow area may be improved. Furthermore, an electrolyte residue in the seal portion may be reduced to prevent the electrolyte from damaging the seal portion from inside during a long-period use of the cell, so that a seal strength of the seal portion 121 of the cell 110 may be increased significantly, and the reliability and safety of the sealing of the cell 110 may be improved. In addition, during a tensile test on the seal portion 121, it is found that a force-bearing point of the seal portion 121 may be shifted through the recess portion 160, and a large tensile force may be borne, which also verifies that it is possible to increase the seal strength of the seal portion 121 of the cell 110 by providing the seal portion 121 with the recess portion 160, and hence improving the reliability and safety of the sealing of the cell 110.

As illustrated in FIG. 3, according to some embodiments of the present disclosure, the packaging pouch 120 can include a first casing 140 and a second casing 150. The first casing 140 includes a first bonding layer 141, the second casing 150 includes a second bonding layer 151, and the first bonding layer 141 and the second bonding layer 151 are bonded to form the sealed area and an accommodating space 130 for accommodating the cell body 111. The recess portion 160 is connected with the accommodating space 130 and recessed in a direction away from the accommodating space 130. With this configuration, a structural stability of the seal portion 121 may be improved, the sealing of the cell 110 may be facilitated, and also it is advantageous for the sealed area to be formed between the first bonding layer 141 and the second bonding layer 151, so as to provide the accommodating space 130.

Figure 11:
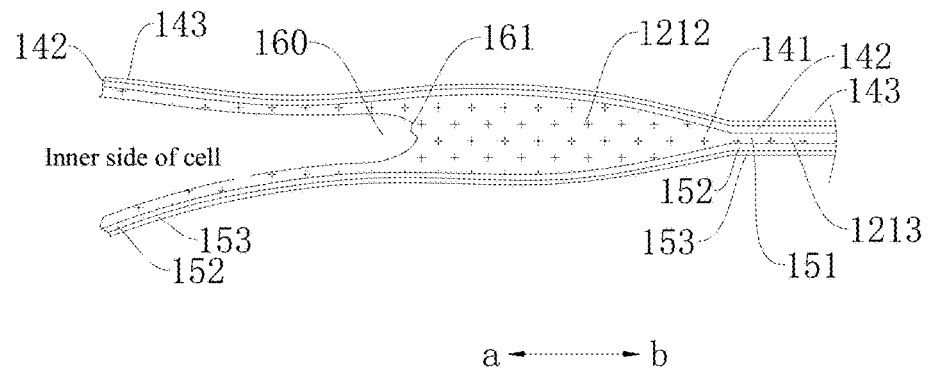
FIG. 11 illustrates an enlarged view of a partial structure in FIG. 10.

In some embodiments, as illustrated in FIG. 11, the first casing 140 further includes a first metal layer 142 and a first protection layer 143, and the first metal layer 142 is arranged between the first bonding layer 141 and the first protection layer 143. Similarly, the second casing 150 includes a second metal layer 152 and a second protection layer 153, and the second metal layer 152 is arranged between the second bonding layer 151 and the second protection layer 153. The first protection layer 143 and/or the second protection layer 153 may be made of polyamide (PA), polyethylene terephthalate (PET) or a combination thereof. The first metal layer 142 and/or the second metal layer 152 may be made of aluminum (Al), steel, etc. The first bonding layer 141 and/or the second bonding layer 151 may be made of polypropylene (PP), polyethylene (PE), polyethylene naphthalate (PEN) or a combination thereof.

In some embodiments, as illustrated in FIGS. 3 and 4, the sealed area includes a first sealed segment 1212 and a second sealed segment 1213. One end of the first sealed segment 1212 is connected with the second sealed segment 1213, and an end surface of the other end of the first sealed segment 1212 is recessed in a direction towards the second sealed segment 1213 so as to form the recess portion 160. It can be understood that the sealed area may be formed by heat-pressing the first bonding layer 141 and the second bonding layer 151 by means of the seal head designed by the present disclosure. After the first bonding layer 141 and the second bonding layer 151 are heated to melt, they may flow towards a region of a relatively low pressure when pressed so as to form the glue-overflow area, and the glue-overflow area includes the first sealed segment 1212. In the present disclosure, by improving the shape and the appearance of the glue-overflow area, the recess portion 160 is formed at an interface of the first sealed segment in connection with the accommodating space, which may overcome the structural defect of the glue-overflow area and shift the force-bearing point of the seal portion 121 of the cell 110 obtained by a traditional seal head and the sealing technology thereof, and hence may change a force-bearing style of the seal portion 121, so that the large tensile force may be borne and the seal strength of the seal portion 121 of the cell 110 may be improved significantly, and the stability and safety of the sealing of the battery and the cell thereof may be improved.

According to some embodiments of the present disclosure, as illustrated in FIG. 4, in a first direction approaching the accommodating space 130, for example, in a direction from b to a as illustrated in FIG. 4, a length of the sealed area including the first sealed segment 1212 and the second sealed segment 1213 (i.e. a width between two ends of the seal head of the present disclosure in the a-b direction) is L1, and a length of the second sealed segment 1213 (i.e. a length between an outermost end surface of the seal portion 121 of the cell 110 and a position where the protrusion of the seal portion 121 appears) is L2, and L1/L2 is greater than or equal to 1.2 and less than or equal to 10. In some embodiments, L1/L2 is greater than or equal to 1.5 and less than or equal to 3. In this case, the seal portion 121 has a high seal strength. It is to be noted that the position where the protrusion appears and the position where the protrusion disappears may be seen clearly from a surface appearance of the seal portion 121 of the cell 110, or the two positions may be left in the seal portion 121 of the cell by the seal head of the present disclosure.

According to some embodiments of the present disclosure, as illustrated in FIG. 4, in a second direction substantially perpendicular to the first direction, a maximum thickness of the first sealed segment 1212 is T1, a thickness of the second sealed segment 1213 is T2, and T1/T2 is greater than or equal to 1.5 and less than or equal to 4. In some embodiments, T1/T2 is greater than or equal to 1.5 and less than or equal to 2.5. In this case, the seal portion 121 has a high seal strength.

In some embodiments, as illustrated in FIG. 4 and in the second direction, a longitudinal section area of the first sealed segment 1212 is N, a longitudinal section area of the second sealed segment 1213 is K, and N/K is greater than 0 and less than or equal to 100. In some embodiments, N/K is greater than or equal to 0.1, and less than or equal to 50. In some embodiments, N/K is greater than or equal to 0.1 and less than or equal to 1. It should be noted that each of the section areas is measured in a following method: obtaining a sectional appearance of the seal portion by cutting the seal portion along a section line C-C or D-D in FIG. 1, and measuring N and K with an area measure function of VHX-5000 microscope (Keyence Corporation).

Next, taking an example in which the packaging pouch is made of an aluminum-plastic film, a failure mode of the sealed area of the seal portion obtained by using this packaging pouch is researched. The packaging pouch includes an upper aluminum-plastic film (i.e. the first casing) and a lower aluminum-plastic film (i.e. the second casing), and the accommodating space and the sealed area of the seal portion are formed by pressing the upper aluminum-plastic film and the lower aluminum-plastic film with the hot pressing process. The upper aluminum-plastic film and the lower aluminum-plastic film each include an outer layer, a medium layer, and an inner layer. The outer layer (i.e. the first protection layer 143 or the second protection layer 153) is made of PET or PA, the medium layer (i.e. the first metal layer 142 or the second metal layer 152) is made of Al, and the inner layer (i.e. the first bonding layer 141 or the second bonding layer 151) is made of PP. The tensile test is performed on the outer layer, the medium layer, the inner layer of the aluminum-plastic film, the sealed area produced by the traditional seal head, and the sealed area obtained by the sealing technology of the present disclosure, separately, and tensile curves are obtained, as illustrated in FIGS. 5 to 9. It is to be noted that the tensile curve may be obtained in a following method: clamping a sample strip in a clamp of a universal materials tester (SHENZHEN SUNS TECH STOCK CO., LTD., UTM6101 model) and stretching the sample strip at a speed of 30 mm/min so as to obtain the tensile curve. The sample strip of the sealed area may be obtained in a following method: taking FIG. 1 as an example, cutting the sealed area in FIG. 1 open along the section line C-C or D-D and cutting it into sample strips having a width of 8 mm (with scissors, blades, die cutters, etc.), and the width of the sample strip refers to a distance between two ends of the sample strip in a direction perpendicular to the section line C-C or D-D. The sample strips of the outer layer, the medium layer and the inner layer of the aluminum-plastic film are prepared in a same size as the sealed area described above.

Figure 8:
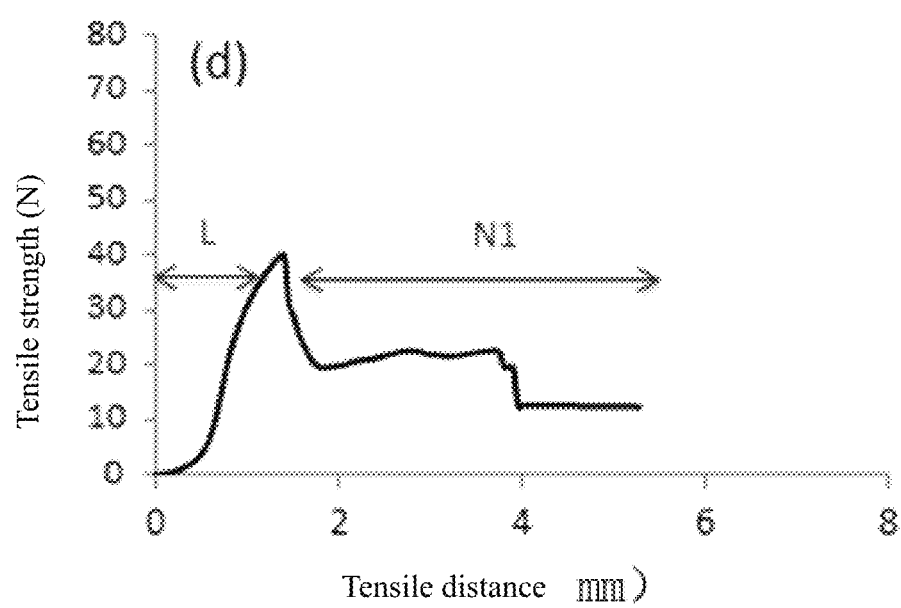
FIG. 8 illustrates a tensile curve of a sealed area of a cell obtained by means of a traditional flat seal head.
Figure 9:
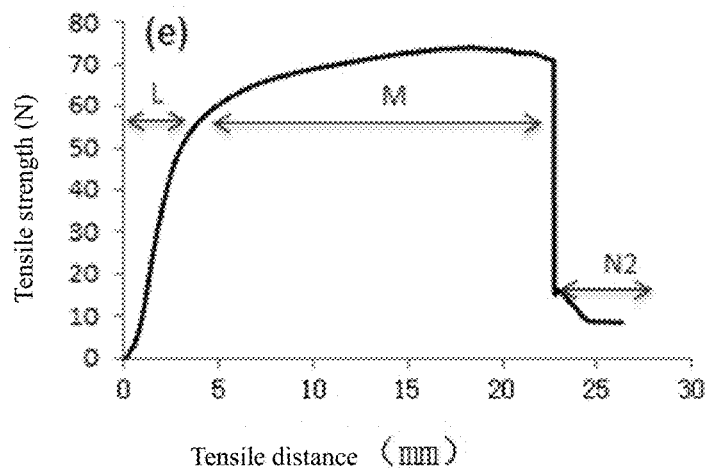
FIG. 9 illustrates a tensile curve of a sealed area of a cell obtained by a sealing technology according to the present disclosure.

It can be known from FIG. 8 that the tensile curve of the sealed area obtained by the traditional seal head includes an L stage and an N1 stage. In the L stage, PA or PET, Al and PP of the aluminum-plastic film and PP of the glue-overflow area are slightly stretched. When stretched to a certain extent (the maximum value), PP of the glue-overflow area undergoes a plastic deformation and enters the N1 stage (PP-PP/PP-Al layering appears, which is judged to have a failure). In this case, PA or PET, Al and PP are not stretched anymore, and the tensile force is provided by PP of the glue-overflow area through its ductility with a very low strength. It can be known from FIG. 9 that the tensile curve of the sealed area obtained by the sealing technology of the present disclosure includes an L stage, an M stage and an N2 stage. In the L stage, PA or PET, Al and PP of the aluminum-plastic film are stretched slightly, and PP of the glue-overflow area is slightly stretched or not deformed. In the M stage, PA or PET, Al and PP of the aluminum-plastic film undergo a serious plastic stretching, and PP of the glue-overflow area is stretched slightly. As PA or PET, and PP have better toughness than Al, the curve in this stage is same with that of Al. When Al is stretched to be broken, the tensile curve is attenuated rapidly (vertically) and the N2 stage is entered. Different from the N1 stage, the tensile force in the N2 stage is provided by PP, PET or PA at a fracture of Al of the aluminum-plastic film, and a failure mode is changed from the PP-PP (a bonding layer of PP of the upper aluminum-plastic film and the PP of the lower aluminum-plastic film) or PP-Al layering in the N1 stage to the abruption of the aluminum-plastic film in the N2 stage.

Figure 10:
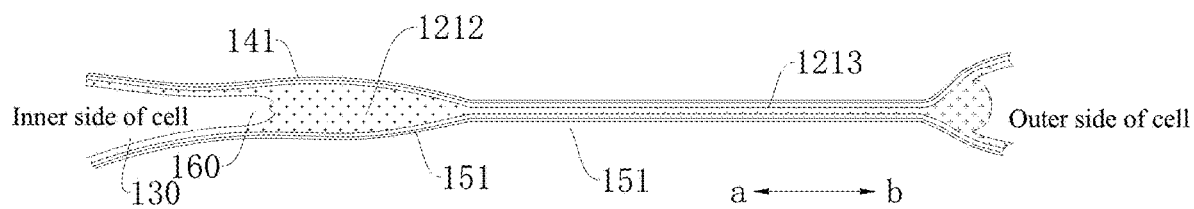
FIG. 10 illustrates a partial section view of a sealed area of a cell according to another embodiment of the present disclosure, and the section view is obtained by cutting the sealed area along a section line C-C or D-D illustrated in FIG. 1.

According to some embodiments of the present disclosure, as illustrated in FIGS. 4 and 10, at least a part of a contact surface between the recess portion 160 and the accommodating space 130 may be a smooth surface. Thus, it is possible to prevent the occurrence of stress concentration at the contact surface, so as to further increase a value of the tensile force bearable of the seal portion 121, and hence increase the seal strength of the seal portion 121 further. It is to be noted that a shape of the contact surface is not limited to this, as long as it may enhance the strength of the seal portion 121. For example, in some embodiments, at least a part of the contact surface between the recess portion 160 and the accommodating space 130 may be an arc surface. It is to be noted that a shape of an inner wall surface of the recess portion 160 is not particularly limited herein, as long as a central part of the recess portion 160 has a shape recessed towards an interior of the first sealed segment 1212. For example, in some embodiments, the recess portion 160 may have a smooth V shape, a U shape or a pocket shape, etc., and the present disclosure is not limited thereto.

In some embodiments, as illustrated in FIG. 4 or FIG. 10, in the direction approaching the accommodating space 130 (for example, in a direction from b to a as illustrated in FIG. 4), a thickness of the first sealed segment 1212 increases gradually first and then decreases gradually. In a direction from b to a as illustrated in FIG. 10, the thickness of the first sealed segment 1212 increases gradually first, and when the thickness increases to the maximum value, the thickness of the first sealed segment 1212 starts to decrease gradually.

Figure 12:
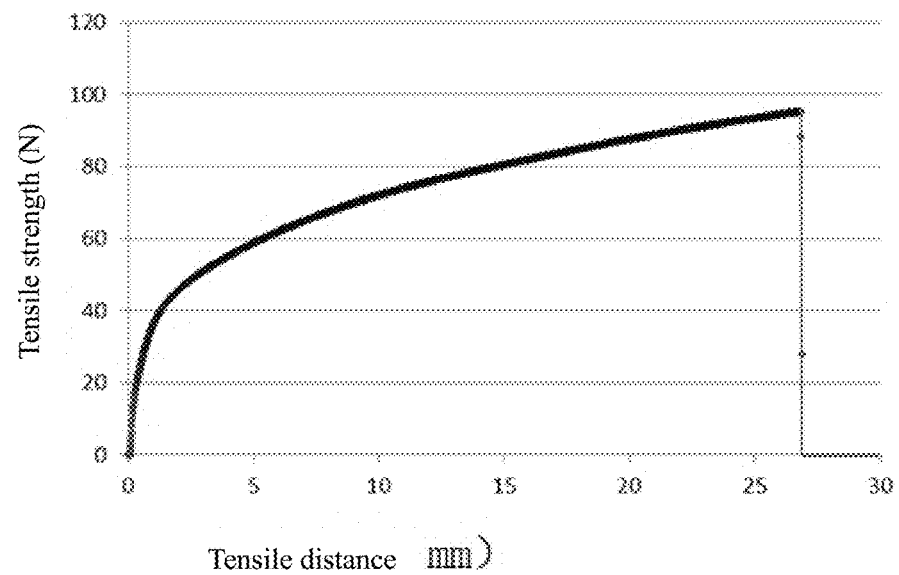
FIG. 12 illustrates a tensile curve of a sealed area in FIG. 10.

In some embodiments, as illustrated in FIG. 10 or FIG. 11, a bottom of the recess portion 160 has a bulge 161, and the bulge 161 protrudes towards the accommodating space 130. In this case, the bottom of the recess portion 160 exhibits a tiny M shape. When the tensile test is performed on the recess portion 160 having the bulge 161, the tensile curve is obtained as illustrated in FIG. 12. It can be known from FIG. 12 that the force-bearing point of the first sealed segment is still positioned at the bottom of the recess portion, and the seal strength of the seal portion may still be enhanced.

Figure 13:
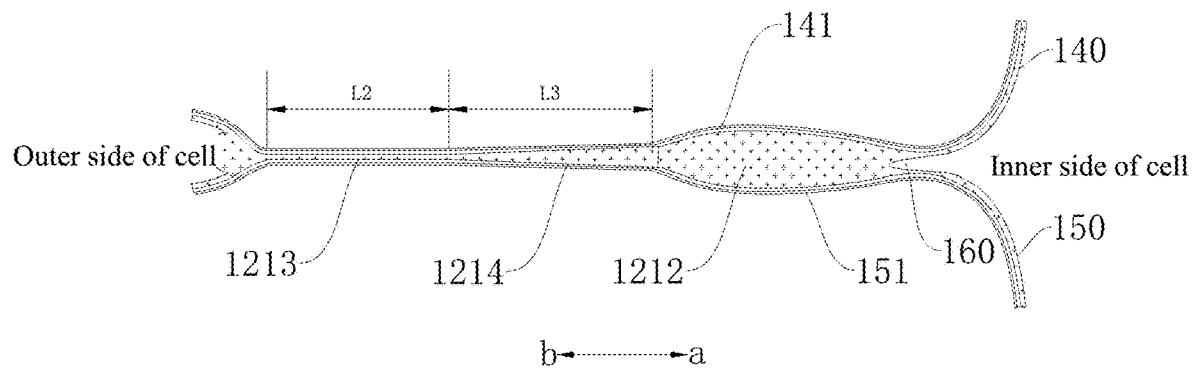
FIG. 13 illustrates a partial section view of a sealed area of a cell according to another embodiment of the present disclosure, and the section view is obtained by cutting the sealed area along a section line C-C or D-D illustrated in FIG. 1.

As illustrated in FIG. 13, according to some embodiments of the present disclosure, the sealed area further includes a third sealed segment 1214. The third sealed segment 1214 is arranged between the first sealed segment 1212 and the second sealed segment 1213. In the direction approaching the accommodating space 130 (for example, the direction from b to a in FIG. 13), a thickness of the third sealed segment 1214 increases gradually. Specifically, in the direction approaching the accommodating space 130, a length of the second sealed segment 1213 is L2, a length of the third sealed segment 1214 (i.e. a length between a position where the thickness of the sealed area starts to increase gradually and a position where a protrusion appears) is L3, and L2/L3 is greater than or equal to 0. The less the L2, the higher the ability of the sealed area to resist process fluctuations. The less the L3, the higher the ability of the sealed area to resist wear. In some embodiments, L2/L3 is greater than or equal to 0.5, and is less than or equal to 2.

As illustrated in FIG. 13, in the first direction approaching the accommodating space 130, an inclined angle of the third sealed segment 1214 is α, and the length of the third sealed segment 1214 is L3. In the second direction, a maximum thickness of the third sealed segment 1214 is max(T1), a minimum thickness of the third sealed segment 1214 is min(T1), and max(T1)=min(T1)+L3·tan α, in which $0° \leq α \leq 2°$. In some embodiments, the maximum thickness of the first sealed segment 1212 may be equal to the minimum thickness of the third sealed segment 1214, i.e., max(T1) =min(T3).

In addition, the present disclosure further provides a battery obtained according to the above-mentioned cell. The battery includes a cell 110 and a housing for accommodating the cell 110 therein. The cell 110 includes a cell body 111 and a packaging pouch 120 for accommodating the cell body 111 therein. The packaging pouch 120 includes a seal portion 121. The seal portion 121 includes a sealed area. The sealed area includes a recess portion 160. The recess portion 160 is arranged in an end surface of the sealed area adjacent to the cell body 111, and is recessed in a direction away from the cell body 111.

The cell 110 according to embodiments of the present disclosure will be described in detail below via specific embodiments with reference to accompanying drawings. It is to be understood that the following description is only illustrative and is not limitation to the present disclosure.

Embodiment One

In the present embodiment, the packaging pouch 120 is made of an aluminum-plastic film, and the aluminum-plastic film includes an outer layer, a medium layer, and an inner layer. The outer layer is made of PA, PET or a composite material thereof. The medium layer may be an aluminum metal layer. The inner layer may be a PP layer. The packaging pouch 120 is configured to accommodate the cell 110 therein. The seal portion 121 of the packaging pouch 120 at a side thereof is cut along the section line C-C or D-D as illustrated in FIG. 1, so as to obtain a section view as illustrated in FIG. 4. The recess portion 160 has a U shape.

As illustrated in FIG. 4, in the first direction approaching the accommodating space 130 (for example, the direction from b to a), the length L1 of the sealed area is 10 mm, the length L2 of the second sealed segment 1213 is 7 mm, and L1/L2=1.4. As illustrated in FIG. 4, in the second direction, the maximum thickness T1 of the first sealed segment 1212 is 0.45 mm, and the thickness T2 of the second sealed segment 1213 is 0.25 mm. A longitudinal section area N of the first sealed segment 1212 is 0.38 mm², and a longitudinal section area K of the second sealed segment 1213 is 1.61 mm².

Figure 14:
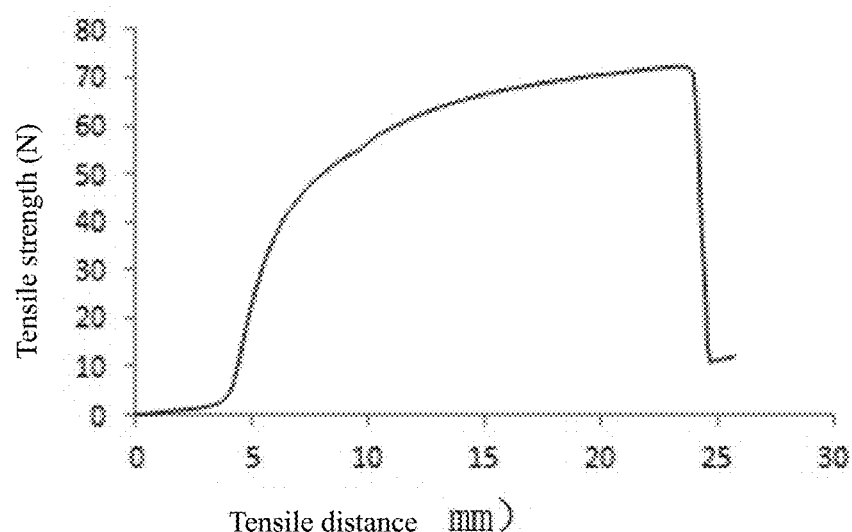
FIG. 14 illustrates a tensile curve of a sealed area according to embodiment one of the present disclosure.

The seal portion 121 of the packaging pouch 120 at the side thereof obtained in the embodiment one is cut open and cut into sample strips having a width of 8 mm, and a tensile test is performed on the sample strip in the universal materials tester to obtain the tensile curve as illustrated in FIG. 14. It can be seen from FIG. 14 that the maximum value of the tensile curve is 73 N. When the sample strip is stretched, the aluminum-plastic film is broken, but the sealed area formed by the first bonding layer 141 (PP layer) and the second bonding layer 151 (PP layer) is not separated.

Embodiment Two

Different from the embodiment one, the recess portion 160 has a V shape, L1=5 mm, L2=2 mm; T1=0.39 mm, T2=0.18 mm; and K=0.36 mm², N=0.31 mm².

Figure 15:
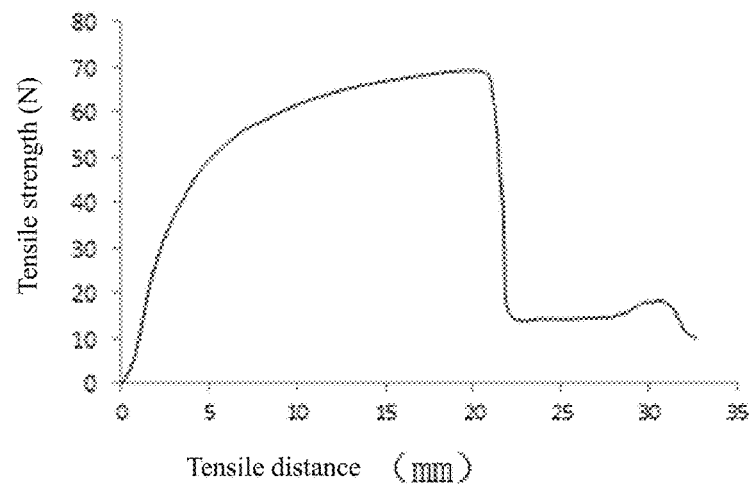
FIG. 15 illustrates a tensile curve of a sealed area according to embodiment two of the present disclosure.

The seal portion 121 of the packaging pouch 120 at the side thereof obtained in the embodiment two is cut open and cut into sample strips having a width of 8 mm, and a tensile test is performed on the sample strip in the universal materials tester to obtain the tensile curve as illustrated in FIG. 15. It can be seen from FIG. 15 that the maximum value of the tensile curve is 69 N. When the sample strip is stretched, the aluminum-plastic film is broken, but the sealed area formed by the first bonding layer 141 (PP layer) and the second bonding layer 151 (PP layer) is not separated.

Embodiment Three

Figure 16:
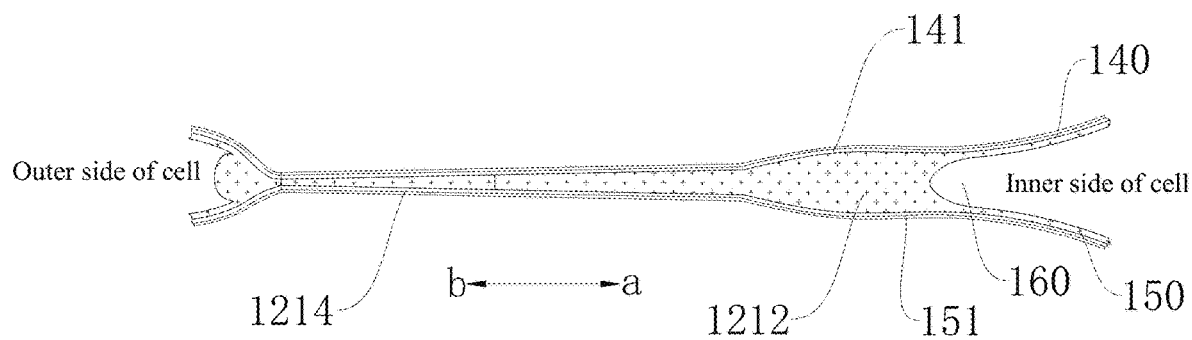
FIG. 16 illustrates a partial section view of a sealed area of a cell according to embodiment three of the present disclosure, and the section view is obtained by cutting the sealed area along a section line C-C or D-D illustrated in FIG. 1.

Different from the embodiment one, the seal portion 121 of the packaging pouch 120 at a side thereof is cut along the section line C-C or D-D as illustrated in FIG. 1, so as to obtain a section view as illustrated in FIG. 16. The recess portion 160 has a U shape. In the present embodiment, in the first direction from b to a as illustrated in FIG. 15, the length L1 of the first sealed segment 1212 is 1.5 mm, and the length L3 of the third sealed segment 1214 is 4.5 mm. In the second direction, the maximum thickness T1 of the first sealed segment 1212 is 0.39 mm, and the thickness of the third sealed segment 1214 increases gradually. An inclined angle α of the third sealed segment 1214 is 0.5°, a maximum thickness of the third sealed segment 1214 is max(T3), a minimum thickness of the third sealed segment 1214 is min(T3), and max(T3)=min(T3)+L3·tan α=0.28 mm.

Figure 17:
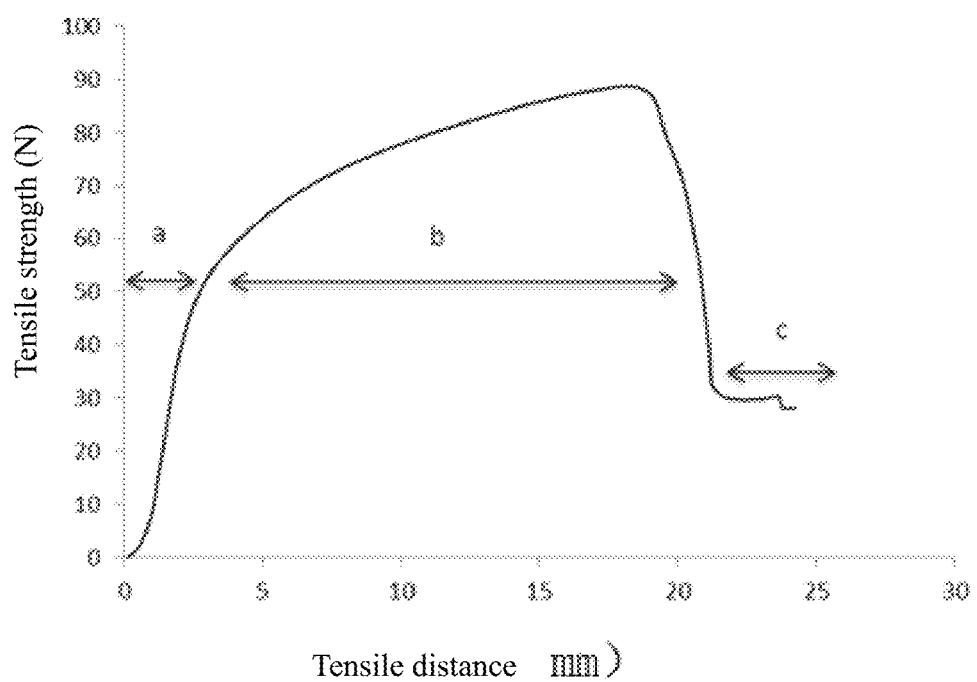
FIG. 17 illustrates a tensile curve of a sealed area in FIG. 16.

The seal portion 121 of the packaging pouch 120 at the side thereof obtained in the embodiment three is cut open and cut into sample strips having a width of 8 mm, and a tensile test is performed on the sample strip in the universal materials tester to obtain the tensile curve as illustrated in FIG. 17. It can be seen from FIG. 17 that when the sealing process is carried out based on this solution, a maximum peak value of the tensile curve is 89.6 N, which corresponds to the strength of the third sealed segment 1214 (i.e. the glue-overflow area). When the sample strip is stretched, the glue-overflow area undergoes a certain elastic deformation first, as illustrated in a stage 'a' in FIG. 17. Then, as the glue-overflow area has a too high strength, the plastic deformation of the PP layer of the glue-overflow area and the stretching of the aluminum-plastic film will occur simultaneously, i.e., a stage 'b' in FIG. 17. As the aluminum-plastic film adopted in the present embodiment has a relatively high strength, and a tensile strength of the PP layer of the glue-overflow area does not exceed a tensile strength of the aluminum-plastic film itself, the PP layer of the glue-overflow area is stretched to be broken after the aluminum-plastic film necks, and the subsequent tensile curve is illustrated as a stage 'c' in FIG. 17.

In the specification, it is to be understood that terms such as "length", "width", "thickness", "upper", "lower", "inner" and "outer" should be construed to refer to the orientation as then described or as shown in the drawings under discussion. These relative terms are for convenience of description and do not require that the present disclosure be constructed or operated in a particular orientation, which may not be understood to limit the present disclosure. In the description of the present disclosure, "a plurality of" means two or more than two.

Reference throughout this specification to "an embodiment", "some embodiments", "illustrative embodiments", "an example", "a specific example" or "some examples" means that a particular feature, structure, material, or characteristic described in connection with the embodiment or example is included in at least one embodiment or example of the present disclosure. Thus, the appearances of these phrases in various places throughout this specification are not necessarily referring to the same embodiment or example of the present disclosure. Furthermore, the particular features, structures, materials, or characteristics may be combined in any suitable manner in one or more embodiments or examples.

While the embodiments of the present disclosure have been illustrated and described, it will be understood by those skilled in the art that various changes, alternatives, variation and modifications can be made in the embodiments without departing from spirit and principles of the present disclosure, and the scope of the present disclosure is defined by the claims and their equivalents.

What is claimed is:

1. A cell, comprising:
   a cell body; and
   a packaging pouch, configured to accommodate the cell body therein, the packaging pouch comprising:
   a first casing, the first casing comprises a first bonding layer; and
   a second casing, the second casing comprises a second bonding layer,
   wherein the first bonding layer and the second bonding layer are bonded to define an accommodating space configured to accommodate the cell body therein and form a seal portion adjacent the accommodating space; and
   the seal portion comprising a sealed area,
   wherein the sealed area comprises a recess portion, the recess portion is provided in an end surface of the sealed area adjacent to the cell body, and the recess portion is connected to the accommodating space and recessed in a direction away from the cell body, and
   wherein the sealed area comprises a first sealed segment and a second sealed segment, one end of the first sealed segment is connected to the second sealed segment, and an end surface of the other end of the first sealed segment is recessed in the direction away from the cell body to define the recess portion,
   wherein a segment of the sealed area immediately adjacent to the accommodating space has a variable thickness such that a thickness of the sealed area first increases along the direction away from the cell body to a maximum thickness and then decreases along the direction away from the cell body, and
   wherein a longitudinal section area of the first sealed segment is N, a longitudinal section area of the second sealed segment is K, and N/K is greater than 0 and less than or equal to 100.

2. The cell according to claim 1, wherein in a direction approaching the accommodating space, a length of the sealed area is L1, a length of the second sealed segment is L2, and L1/L2 is greater than or equal to 1.2:1 and less than or equal to 10:1.

3. The cell according to claim 1, wherein a maximum thickness of the first sealed segment is T1, a thickness of the second sealed segment is T2, and T1/T2 is greater than or equal to 1.5:1 and less than or equal to 4:1.

4. The cell according to claim 1, wherein in a direction approaching the accommodating space, a thickness of the first sealed segment increases gradually first and then decreases gradually.

5. The cell according to claim 1, wherein at least a part of a contact surface between the recess portion and the accommodating space is a smooth surface.

6. The cell according to claim 1, wherein at least a part of a contact surface between the recess portion and the accommodating space is an arc surface.

7. The cell according to claim 1, wherein a bottom of the recess portion has a bulge, and the bulge protrudes towards the accommodating space.

8. The cell according to claim 1, wherein the sealed area further comprises a third sealed segment, the third sealed segment is arranged between the first sealed segment and the second sealed segment, and a thickness of the third sealed segment increases gradually in a direction approaching the accommodating space.

9. The cell according to claim 8, wherein in the direction approaching the accommodating space, a length of the second sealed segment is L2, a length of the third sealed segment is L3, and L2/L3 is greater than or equal to 0.5, and is less than or equal to 2.

10. A battery, comprising:
    a cell; and
    a housing, configured to accommodate the cell therein, the cell comprising:
    a cell body; and
    a packaging pouch, configured to accommodate the cell body therein, the packaging pouch comprising:
    a first casing, the first casing comprises a first bonding layer; and
    a second casing, the second casing comprises a second bonding layer,
    wherein the first bonding layer and the second bonding layer are bonded to define an accommodating space configured to accommodate the cell body therein and form a seal portion adjacent the accommodating space; and
    the seal portion comprising a sealed area,
    wherein the sealed area comprises a recess portion, the recess portion is provided in an end surface of the sealed area adjacent to the cell body, and the recess portion is connected to the accommodating space and recessed in a direction away from the cell body, and
    wherein the sealed area comprises a first sealed segment and a second sealed segment, one end of the first sealed segment is connected to the second sealed segment, and an end surface of the other end of the first sealed segment is recessed in the direction away from the cell body to define the recess portion,
    wherein a segment of the sealed area immediately adjacent to the accommodating space has a variable thickness such that a thickness of the sealed area first increases along the direction away from the cell body to a maximum thickness and then decreases along the direction away from the cell body, and wherein a longitudinal section area of the first sealed segment is N, a longitudinal section area of the second sealed segment is K, and N/K is greater than 0 and less than or equal to 100.

11. The battery according to claim 10, wherein in a direction approaching the accommodating space, a thickness of the first sealed segment increases gradually first and then decreases gradually.

12. The battery according to claim 10, wherein at least a part of a contact surface between the recess portion and the accommodating space is a smooth surface.

13. The battery according to claim 10, wherein at least a part of a contact surface between the recess portion and the accommodating space is an arc surface.

14. The battery according to claim 10, wherein a bottom of the recess portion has a bulge, and the bulge protrudes towards the accommodating space.

15. The battery according to claim 10, wherein the sealed area further comprises a third sealed segment, the third sealed segment is arranged between the first sealed segment and the second sealed segment, and a thickness of the third sealed segment increases gradually in a direction approaching the accommodating space.

* * * * *